No. 676,546.
O. W. McCARRON.
NUT LOCK.
(Application filed Mar. 30, 1900.)
Patented June 18, 1901.
(No Model.)
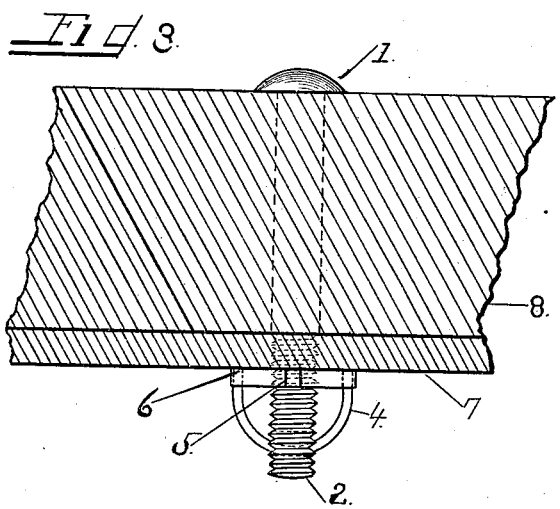
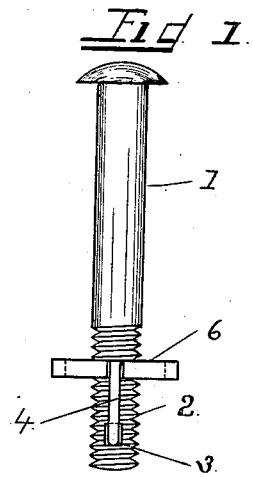
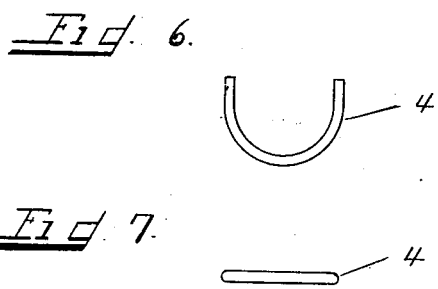
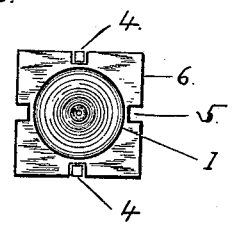
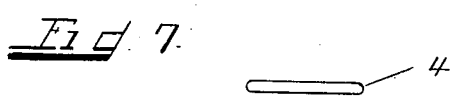
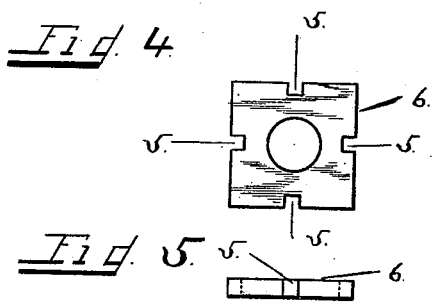
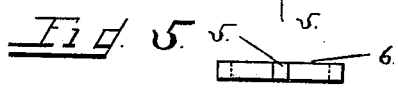
WITNESSES:
H. C. Killeen
J. A. Lucas.
INVENTOR.
Otho W. McCarron
BY Emil Starek
ATTORNEY.
THE NORRIS PETERS CO., PHOTO-LITHO., WASHINGTON, D. C.

UNITED STATES PATENT OFFICE.

OTHO W. McCARRON, OF BATEMANTOWN, OHIO.

NUT-LOCK.

SPECIFICATION forming part of Letters Patent No. 676,546, dated June 18, 1901.

Application filed March 30, 1900. Serial No. 10,861. (No model.)

*To all whom it may concern:*

Be it known that I, OTHO W. MCCARRON, a citizen of the United States, residing at Batemantown, in the county of Knox and State of Ohio, have invented certain new and useful Improvements in Nut-Locks, of which the following is a full, clear, and exact description, reference being had to the accompanying drawings, forming a part hereof.

My invention has relation to improvements in nut-locks; and it consists in the novel arrangement and combination of parts more fully set forth in the specification and pointed out in the claim.

In the drawings, Figure 1 is an elevation of the bolt and nut attached. Fig. 2 is a top plan thereof. Fig. 3 is an elevation taken at right angles to Fig. 1, showing a sectional piece of timber and plate secured by the bolt and nut. Fig. 4 is a detached plan of the nut. Fig. 5 is an edge view. Fig. 6 is a plan of the locking-spring, and Fig. 7 is an end view thereof.

The object of my invention is to construct a nut-lock which will effectively prevent the turning of a nut upon the screw-threaded portion of a bolt after the same has once been screwed to the desired extent.

In detail the invention may be described as follows:

Referring to the drawings, 1 represents the bolt, and 2 the screw-threaded extension thereof. The latter is provided near the outer end with a transversely-disposed opening or aperture 3, through which may be inserted the U-shaped freely-resilient locking-spring 4, the arms of the spring being adapted to snap into the bottoms of a series of depressions or recesses 5 formed along the different edges of the nut 6. While the resilience of the arms enables the same to hug the bases of the recesses, the spring as a whole is sufficiently yielding in a direction parallel to the axis of the bolt to enable the nut to be driven or screwed to any position along the screw-threaded portion 2, the free ends of the arms under the circumstances always firmly bearing against the surface of the plate 7, which the nut is intended to retain in its place to its adjacent member 8. It is to be understood that I do not limit myself to the precise number or disposition of the recesses 5, so they are disposed in a manner and in sufficient numbers to simultaneously receive the ends of the arms of the spring after the latter has been passed into the opening 3 of the bolt. The opening is preferably rectangular as well as the cross-section of the spring 4. It is apparent that once the arms of the spring are embedded in the recesses of the nut the latter, as well as the bolt, are securely locked. It may be added that by making the arms of the U-shaped spring resilient they adapt themselves to nuts of various sizes, as is obvious.

Having described my invention, what I claim is—

A nut-lock comprising a bolt having a screw-threaded portion, a rectangular transverse aperture formed in the latter, a nut having a series of recesses formed along the edges thereof, a U-shaped spring rectangular in cross-section, adapted to be passed through and supported by the walls of the aperture aforesaid, the arms of the spring being freely resilient and bearing against the bases of the recesses formed in the nut, substantially as set forth.

In testimony whereof I affix my signature in presence of two witnesses.

OTHO W. McCARRON.

Witnesses:
ROY COCHRAN,
LOUISA COCHRAN.